US011345132B2

(12) United States Patent
Oyama et al.

(10) Patent No.: US 11,345,132 B2
(45) Date of Patent: May 31, 2022

(54) OPTICAL SHEET AND OPTICAL COMPONENT

(71) Applicant: SUMITOMO BAKELITE CO., LTD., Shinagawa-ku (JP)

(72) Inventors: Takuya Oyama, Shinagawa-ku (JP); Tetsuya Ishikawa, Shinagawa-ku (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

(21) Appl. No.: 16/651,645

(22) PCT Filed: Sep. 27, 2018

(86) PCT No.: PCT/JP2018/036149
§ 371 (c)(1),
(2) Date: Mar. 27, 2020

(87) PCT Pub. No.: WO2019/065926
PCT Pub. Date: Apr. 4, 2019

(65) Prior Publication Data
US 2020/0310015 A1 Oct. 1, 2020

(30) Foreign Application Priority Data

Sep. 29, 2017 (JP) .............................. JP2017-192231
Sep. 29, 2017 (JP) .............................. JP2017-192232
May 11, 2018 (JP) .............................. JP2018-092605

(51) Int. Cl.
| | | |
|---|---|---|
| *B32B 27/36* | (2006.01) | |
| *B32B 27/30* | (2006.01) | |
| *G02B 1/04* | (2006.01) | |
| *G02B 5/22* | (2006.01) | |

(52) U.S. Cl.
CPC .......... *B32B 27/365* (2013.01); *B32B 27/306* (2013.01); *G02B 1/04* (2013.01); *G02B 5/223* (2013.01); *B32B 2307/4026* (2013.01); *B32B 2307/42* (2013.01); *B32B 2307/71* (2013.01); *B32B 2551/00* (2013.01); *Y10T 428/31507* (2015.04)

(58) Field of Classification Search
CPC . B32B 27/365; B32B 2551/00; B32B 27/306; B32B 2307/4026; B32B 2307/42; B32B 2307/71; Y10T 428/31507; B29C 48/305; B29C 48/08; G02B 1/04; G02B 1/10; G02B 5/223; G02B 5/208; G02B 5/30; G02B 5/22; B29D 11/00788; B29D 11/00634; B29D 11/0073; B29D 11/00009; G02C 7/104; G02C 7/10; G02C 2202/16; G02C 7/12
See application file for complete search history.

(56) References Cited

U.S. PATENT DOCUMENTS

| | | | | |
|---|---|---|---|---|
| 6,103,856 A | * | 8/2000 | Funakoshi | ............. C08K 5/156 |
| | | | | 528/196 |
| 2006/0159926 A1 | | 7/2006 | Funaki et al. | |
| 2007/0076166 A1 | | 4/2007 | Kobuchi et al. | |
| 2015/0355395 A1 | | 12/2015 | Kimura et al. | |
| 2015/0362728 A1 | | 12/2015 | Tei | |
| 2017/0182366 A1 | | 6/2017 | Shinohara et al. | |
| 2018/0194053 A1 | * | 7/2018 | Wassmer | .................. B29B 9/06 |
| 2018/0355178 A1 | | 12/2018 | Yamada et al. | |
| 2019/0006563 A1 | | 1/2019 | Sato et al. | |

FOREIGN PATENT DOCUMENTS

| | | | |
|---|---|---|---|
| CN | 1910503 | A | 2/2007 |
| CN | 106468802 | A | 3/2017 |
| EP | 2 436 731 | A1 | 4/2012 |
| EP | 2 889 655 | A1 | 7/2015 |
| JP | 11-199683 | A | 7/1999 |
| JP | 2002-3710 | A | 1/2002 |
| JP | 2003-149605 | A | 5/2003 |
| JP | 2003-519398 | A | 6/2003 |
| JP | 2003-195030 | A | 7/2003 |
| JP | 2005-37590 | A | 2/2005 |
| JP | 2005097539 | A * | 4/2005 |
| JP | 2006-31030 | A | 2/2006 |
| JP | 2006-206751 | A | 8/2006 |
| JP | 2007-93927 | A | 4/2007 |
| JP | 2009-67981 | A | 4/2009 |
| JP | 2011-207367 | A | 10/2011 |
| JP | 2012-219169 | A | 11/2012 |
| JP | 2012-226078 | A | 11/2012 |
| JP | 2014043495 | A * | 3/2014 |
| JP | WO 2014/073021 | A1 | 5/2014 |
| JP | 2014-197163 | A | 10/2014 |
| JP | 2015-127414 | A | 7/2015 |
| JP | 2016-71300 | A | 5/2016 |
| JP | 2016-104839 | A | 6/2016 |
| JP | 2017-56685 | A | 3/2017 |
| JP | 2017-88728 | A | 5/2017 |
| JP | WO 2017/073220 | A1 | 5/2017 |
| JP | 2017-113363 | A | 6/2017 |
| JP | 2017199312 | A * | 11/2017 |
| KR | 20080012114 | A * | 2/2008 |

(Continued)

OTHER PUBLICATIONS

Technical Service brochure from Mitsubishi Engineer-Plastics Corporation (accessed online at https://www.m-ep.co.jp/en/pdf/product/iupi_nova/physicality_02.pdf on Sep. 27, 2020). (Year: 2020).*

(Continued)

*Primary Examiner* — John D Freeman
(74) *Attorney, Agent, or Firm* — Obon, McClelland, Maier & Neustadt, L.L.P.

(57) ABSTRACT

An optical sheet of the present invention includes a specific wavelength absorption layer that contains a polycarbonate as a main material and a light absorbing agent that absorbs light of a specific wavelength out of light in a wavelength range of 350 nm to 740 nm, in which the polycarbonate has a viscosity average molecular weight Mv of 20,000 to 30,000. In addition, the specific wavelength absorption layer further includes an ultraviolet absorbing agent that absorbs light in a wavelength range of 100 nm to 420 nm.

20 Claims, 3 Drawing Sheets

(56) References Cited

FOREIGN PATENT DOCUMENTS

| WO | WO 01/49478 A2 | 7/2001 |
| WO | WO 2014/115705 A1 | 7/2014 |
| WO | WO 2017/010076 A1 | 1/2017 |
| WO | WO 2017/110598 A1 | 6/2017 |

OTHER PUBLICATIONS

Machine translation of JP 2014-043495. (Year: 2014).*
Machine translation of KR 20080012114. (Year: 2008).*
Machine translation JP 2005-097539. (Year: 2005).*
International Search Report dated Oct. 30, 2018 in PCT/JP2018/036149 filed on Sep. 27, 2018, 1 page.

* cited by examiner

OPTICAL SHEET AND OPTICAL COMPONENT

TECHNICAL FIELD

The present invention relates to an optical sheet and an optical component.

BACKGROUND ART

For example, there is known an optical sheet that absorbs a specific wavelength range from incident light for the purpose of enhancing the contrast of a visual field or preventing glare (for example, refer to PTL 1). This optical sheet is used by being attached to eyeglasses, sunglasses, sun visors, and the like.

The optical sheet disclosed in PTL 1 includes a resin material and a dye (light absorbing agent) that is contained in the resin material and absorbs light of a specific wavelength out of light in a visible light region, for example. This optical sheet is mold into a sheet shape by mixing a dye in a molten resin material, performing extrusion molding in the state, and then cooling thereof, for example.

However, depending on the type of the resin material or the dye, the dye may aggregate at a time of molding, and the dye may partially aggregate after molding. In addition, in order to suppress the aggregation of the dye, for example, it is considered to sufficiently mix the resin material and the dye by relatively reducing a molecular weight of the resin material and increasing the fluidity in a molten state, for example. However, in this case, sufficient strength after molding may not be obtained.

Thus, it is difficult to achieve both the prevention of aggregation of the dye aggregation and the high strength.

CITATION LIST

Patent Literature

[PTL 1] WO2014/115705

SUMMARY OF INVENTION

Technical Problem

An object of the present invention is to provide an optical sheet and an optical component that prevent aggregation of a light absorbing agent and have sufficient strength.

Solution to Problem

Such an object is achieved by the present invention of the following (1) to (11).

(1) An optical sheet including a specific wavelength absorption layer that contains a polycarbonate as a main material and a light absorbing agent that absorbs light of a specific wavelength out of light in a wavelength range of 350 nm to 740 nm, in which the polycarbonate has a viscosity average molecular weight Mv of 20,000 to 30,000.

(2) The optical sheet according to (1), in which the polycarbonate has a melt flow rate of 3 g/10 min to 30 g/10 min measured in accordance with JIS K7210.

(3) The optical sheet according to (1) or (2), in which the polycarbonate has a water absorption rate of 0.02% to 0.2%.

(4) The optical sheet according to any one of (1) to (3), in which in a case where a melting point of the polycarbonate is denoted by T1 and a melting point of the light absorbing agent is denoted by T2, T1<T2 is satisfied.

(5) The optical sheet according to any one of (1) to (4), in which a content of the light absorbing agent in the specific wavelength absorption layer is 0.001 wt % to 5 wt %.

(6) The optical sheet according to any one of (1) to (5), in which the specific wavelength absorption layer has a stretching degree of 10% or less.

(7) The optical sheet according to any one of (1) to (6), in which the specific wavelength absorption layer further includes an ultraviolet absorbing agent that absorbs light in a wavelength range of 100 nm to 420 nm.

(8) The optical sheet according to (7), in which a content of the ultraviolet absorbing agent in the specific wavelength absorption layer is 0.05 wt % to 8 wt %.

(9) The optical sheet according to (7) or (8), in which a ratio A/B of a content A of the light absorbing agent in the specific wavelength absorption layer to a content B of the ultraviolet absorbing agent in the specific wavelength absorption layer is 0.000125 to 0.625.

(10) The optical sheet according to any one of (1) to (9), in which wherein the light absorbing agent includes at least one selected from the group consisting of a phthalocyanine-based pigment, a porphyrin-based compound, and a merocyanine dye.

(11) An optical component including a substrate and the optical sheet according to any one of (1) to (10), which is laminated on the substrate.

Advantageous Effects of Invention

According to the present invention, it is possible to provide an optical sheet that prevents aggregation of a light absorbing agent and has sufficient strength.

DESCRIPTION OF EMBODIMENTS

Hereinafter, an optical sheet and an optical component of the present invention will be described in detail based on preferable embodiments shown in the accompanying drawings.

First Embodiment

Figure 1:
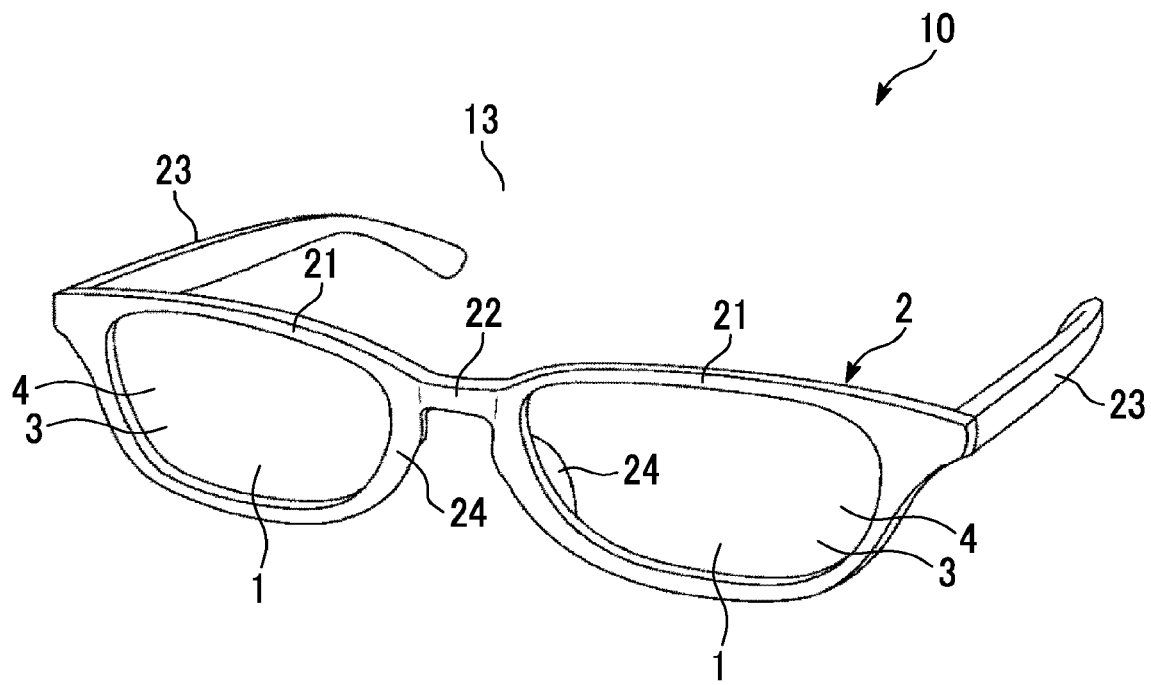
FIG. 1 is a perspective view of a sunglass including an optical sheet (first embodiment) of the present invention.
Figure 2:
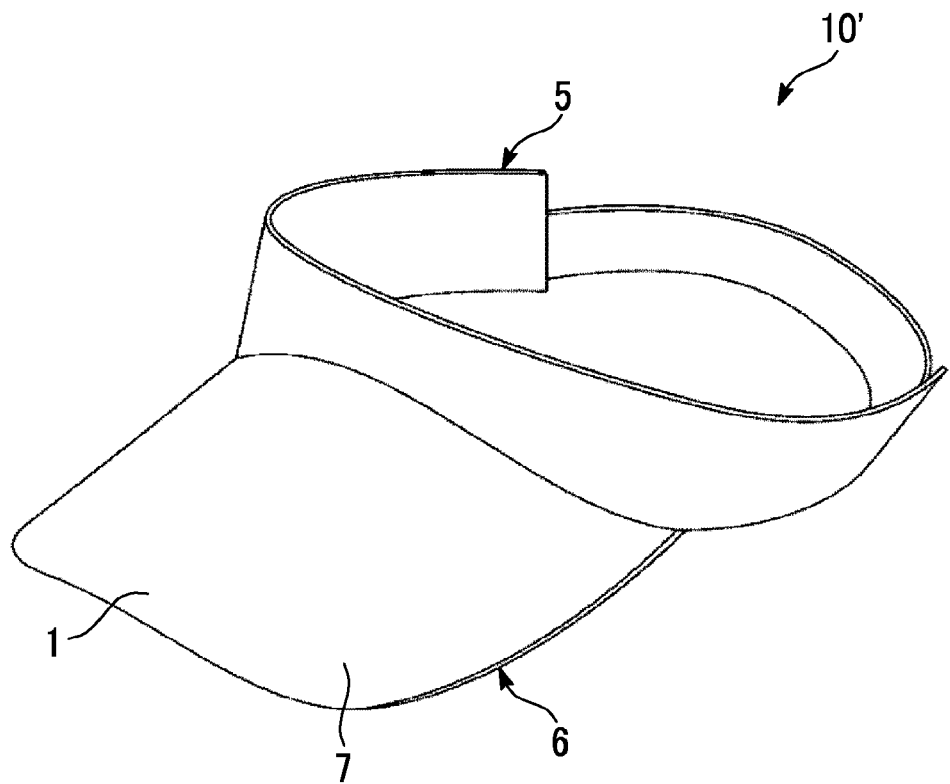
FIG. 2 is a perspective view of a sun visor including the optical sheet (first embodiment) of the present invention.
Figure 5:
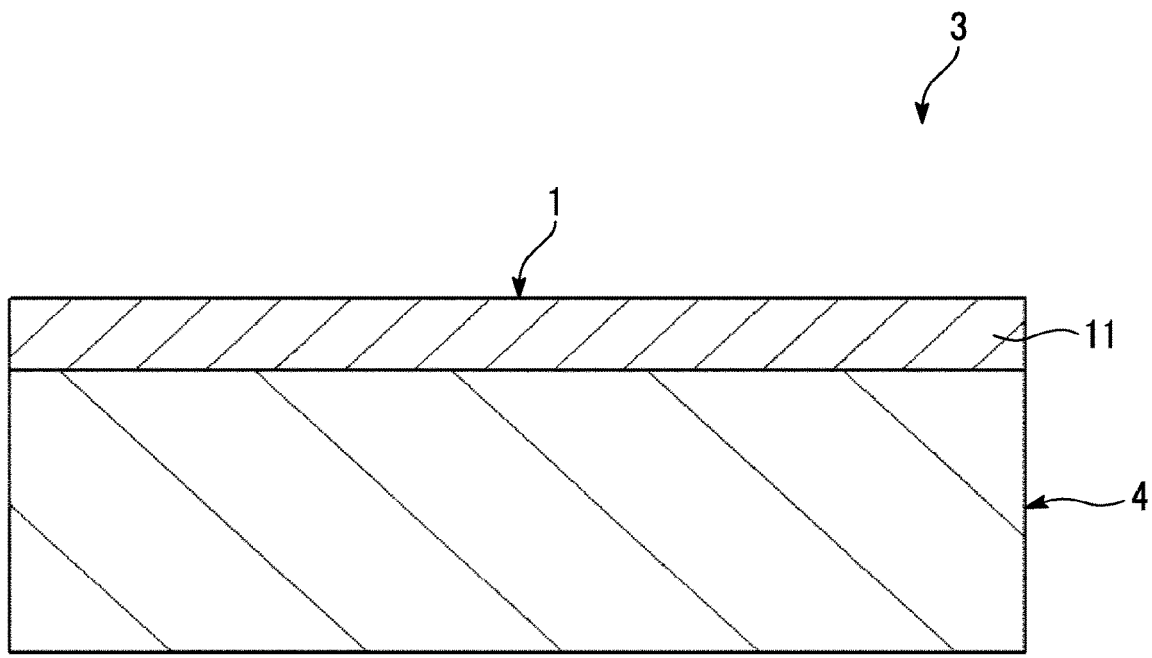
FIG. 5 is a sectional view of the optical component shown in FIG. 1.

FIG. 1 is a perspective view of a sunglass including the optical sheet (first embodiment) of the present invention. FIG. 2 is a perspective view of a sun visor including the optical sheet (first embodiment) of the present invention. FIG. 5 is a sectional view of the optical component shown in FIG. 1.

In FIGS. 1, 2, and 5 (the same applies to FIG. 6), an upper side is referred to as "upper direction" or "upper", and a lower side is also referred to as "lower direction" or "lower". In addition, in the drawings referred to in the present specification, dimensions in a thickness direction are exaggeratedly illustrated, and are significantly different from actual dimensions.

An optical sheet 1 of the present invention shown in FIGS. 1, 2, and 5 includes a specific wavelength absorption layer 11 including a light absorbing agent that absorbs light of a specific wavelength out of light in a wavelength range of 350 nm to 740 nm, using polycarbonate as a main material, and the polycarbonate has a viscosity average molecular weight Mv of 20,000 to 30,000.

With this, the optical sheet 1 can absorb light in a specific wavelength range out of visible light. In addition, since the viscosity average molecular weight Mv of the polycarbonate is 20,000 to 30,000, for example, at a time of extrusion molding, extrusion molding can be performed in a state where the polycarbonate and the light absorbing agent are sufficiently mixed with each other. Therefore, it is possible to prevent a state where the light absorbing agent is excessively aggregated after molding. In addition, since the viscosity average molecular weight Mv of the polycarbonate is 20,000 to 30,000, the optical sheet has sufficient strength. As described above, the optical sheet 1 of the present invention prevents aggregation of an optical absorbing agent and has sufficient strength.

Such optical sheet 1 is used for a sunglass (optical component 10) shown in FIG. 1 and a sun visor (optical component 10') shown in FIG. 2.

As shown in FIG. 1, the sunglass (optical component 10) includes a frame 2 mounted on a user's head, and a lens 3 with an optical sheet (optical component) fixed to the frame 2. In the present specification, the term "lens" includes both of a lens having a light collecting function and a lens not having a light collecting function.

As shown in FIG. 1, the frame 2 is mounted on the head of the user, and includes a rim portion 21, a bridge portion 22, a temple portion 23 that can be hung on the user's ear, and a nose pad portion 24. Each rim portion 21 has a ring shape, and is a portion where the lens 3 with an optical sheet is mounted inside.

The bridge portion 22 is a portion that connects each rim portion 21. The temple portion 23 has a vine shape and is connected to an edge of each rim portion 21. The temple portion 23 is a portion that can be hung on the user's ear. The nose pad portion 24 is a portion that comes into contact with the user's nose in a mounting state in which the sunglass (optical component 10) is mounted on the user's head. With this, it is possible to reliably maintain the mounting state.

A shape of the frame 2 is not limited to the illustrated one as long as the frame 2 can be mounted on a user's head.

The optical component of the present invention includes a lens 4 (substrate) and an optical sheet 1 laminated on a surface of the lens 4 on the front side (side opposite to human eyes in a mounted state). With this, it is possible to exhibit a function as a sunglass while enjoying advantages of the optical sheet 1 described above.

As shown in FIG. 2, the sun visor (optical component 10') includes a ring-shaped mounting portion 5 mounted on a user's head and a collar 6 provided in front of the mounting portion 5. The collar 6 includes a light transmitting member 7 (substrate) and the optical sheet 1 provided on an upper surface of the light transmitting member 7. With this, it is possible to exhibit a function as a sun visor while enjoying advantages of the optical sheet 1 described above.

Constituent materials of the lens 4 and the light transmitting member 7 are not particularly limited as long as the materials have light transmitting properties, and include various resin materials or various glasses. However, the material is preferably the same polycarbonate as the polycarbonate of the optical sheet 1. With this, it is possible to enhance adhesion between the lens 4 or the light transmitting member 7 and the optical sheet 1.

Hereinafter, the optical sheet 1 will be described in detail. In the following, a case of being laminated on the lens 4 (substrate) will be representatively described.

As shown in FIG. 5, the optical sheet 1 includes a specific wavelength absorption layer 11. The specific wavelength absorption layer 11 contains a light absorbing agent and an ultraviolet absorbing agent, using polycarbonate as a main material.

<Polycarbonate>

The polycarbonate is not particularly limited, and various types can be used. Among these, aromatic polycarbonates are preferable. The aromatic polycarbonate includes an aromatic ring in the main chain, and with this, strength of the optical sheet 1 can be further improved.

The aromatic polycarbonate is synthesized by an interfacial polycondensation reaction between bisphenol and phosgene, an ester exchange reaction between bisphenol and diphenyl carbonate, and the like, for example.

Examples of the bisphenol include bisphenol A, bisphenol (modified bisphenol) which is a source of a repeating unit of the polycarbonate represented by the following formula (1), or the like, for example.

[Chem. 1]

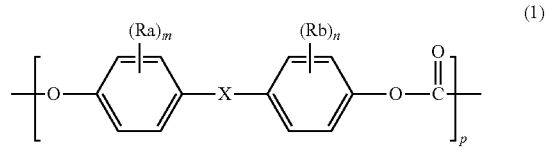

(1)

(In the formula (1), X is an alkyl group having 1 to 18 carbon atoms, an aromatic group, or a cycloaliphatic group, Ra and Rb each independently are an alkyl group having 1 to 12 carbon atoms, m and n each independently are an integer of 0 to 4, and p is the number of repeating units.)

Specific examples of the bisphenol that is a source of the repeating unit of the polycarbonate represented by the formula (1) include 4,4'-(pentane-2,2-diyl)diphenol, 4,4'-(pentane-3,3-diyl)diphenol, 4,4'-(butane-2,2-diyl)diphenol, 1,1'-(cyclohexanediyl)diphenol, 2-cyclohexyl-1,4-bis (4-hydroxyphenyl)benzene, 2,3-bicyclohexyl-1,4-bis (4-hydroxyphenyl)benzene, 1,1'-bis (4-hydroxy-3-methylphenyl)cyclohexane, 2,2'-bis (4-hydroxy-3-methylphenyl)propane, and the like, and one or two or more of these can be used in combination.

In particular, as the polycarbonate, bisphenol type polycarbonate having a skeleton derived from bisphenol is preferable as a main component. By using such a bisphenol type polycarbonate, the optical sheet 1 exhibits further excellent strength.

Such a polycarbonate has a viscosity average molecular weight Mv of 20,000 to 30,000. With this, it is possible to sufficiently enhance the strength of the optical sheet 1. In addition, in a molten state of the polycarbonate, it is possible to sufficiently enhance the fluidity. Accordingly, in a case where the optical sheet 1 is manufactured by extrusion molding, for example, it is possible to perform extrusion molding in a state where the polycarbonate in the molten state and the light absorbing agent are sufficiently mixed with each other. Therefore, it is possible to prevent a state where the light absorbing agent is excessively aggregated after molding. In addition, since the viscosity average molecular weight Mv of the polycarbonate is 20,000 to 30,000, the optical sheet has sufficient strength. As described above, the optical sheet 1 of the present invention prevents aggregation of an optical absorbing agent and has sufficient strength.

In a case where the viscosity average molecular weight Mv of the polycarbonate is too small, sufficient strength cannot be obtained after molding. On the other hand, in a case where the viscosity average molecular weight Mv of the polycarbonate is too large, it is not possible to sufficiently enhance the fluidity in a molten state. For this reason, the mixing of the polycarbonate in the molten state and the light absorbing agent becomes insufficient.

In a case where the viscosity average molecular weight Mv of the polycarbonate is 20,000 to 30,000, it is possible to obtain the effect of the present invention. In a case where the viscosity average molecular weight Mv of the polycarbonate is 23,000 to 28,000, the effect is further remarkably obtained. In a case where the viscosity average molecular weight Mv of the polycarbonate is 24,000 to 27,500, the effect is particularly remarkably obtained.

In addition, polycarbonate preferably has a melt flow rate (MFR) of 3 g/10 min to 30 g/10 min measured in accordance with JIS K7210, and more preferably 15 g/10 min to 25 g/10 min. With this, it is possible to sufficiently enhance the fluidity of polycarbonate in a molten state. Therefore, for example, in a case of manufacturing the optical sheet 1 by extrusion molding, it is possible to perform extrusion molding in a state where the polycarbonate in a molten state and the light absorbing agent are sufficiently mixed with each other.

In addition, polycarbonate preferably has a water absorption rate of 0.02% to 0.2%, and more preferably has a water absorption rate of 0.04% to 0.15%. With this, it is possible to perform extrusion molding in a state where the polycarbonate in a molten state and the light absorbing agent are sufficiently mixed with each other. Therefore, it is possible to prevent the light absorbing agent from being excessively aggregated.

In addition, the water absorption rate in the present specification is a value measured by Aquatrac 3E (manufactured by Brabender Corporation).

In addition, a content of polycarbonate in the specific wavelength absorption layer 11 is preferably 87 wt % to 99.949 wt %, and more preferably 90 wt % to 99.87 wt %. With this, it is possible to reliably exhibit the effect of the present invention.

<Light Absorbing Agent>

The light absorbing agent absorbs light of a specific wavelength. In the present specification, in a case where a value of a maximum absorption wavelength in a visible light region of 420 nm to 780 nm is denoted by $\lambda 1$, a value on a side having a wavelength 20 nm lower than $\lambda 1$ is denoted by $\lambda 2$, and a value on a side having a wavelength 20 nm higher than $\lambda 1$ is denoted by $\lambda 3$, the expression "absorb light" means that the absorbance $\lambda 1/\lambda 2$ or the absorbance $\lambda 1/\lambda 3$ is 1.0 or more.

The light absorbing agent is not particularly limited as long as the light absorbing agent absorbs light of a specific wavelength out of light in a wavelength range of 350 nm to 780 nm, and examples thereof include a quinoline-based coloring agent, an anthraquinone-based coloring agent, and a perylene-based coloring agent. Among these, one or two or more can be used in combination.

Examples of the quinoline-based coloring agent include alkyl-substituted quinoline compounds such as 2-methylquinoline, 3-methylquinoline, 4-methylquinoline, 6-methylquinoline, 7-methylquinoline, 8-methylquinoline, 6-isopropylquinoline, 2,4-dimethylquinoline, 2,6-dimethylquinoline, and 4,6,8-trimethylquinoline, amine group-substituted quinoline compounds such as 2-aminoquinoline, 3-aminoquinoline, 5-aminoquinoline, 6-aminoquinoline, 8-aminoquinoline, and 6-amino-2-methylquinoline, alkoxy-substituted quinoline compounds such as 6-methoxy-2-methylquinoline and 6,8-dimethoxy-4-methylquinoline, and halogen-substituted quinoline compounds such as 6-chloroquinoline; 4,7-dichloroquinoline, 3-bromoquinoline, and 7-chloro-2-methylquinoline.

By blending such a quinoline-based coloring agent, it is possible to absorb light having a wavelength range of 350 nm to 550 nm out of light incident on the specific wavelength absorption layer 11. It is preferable to have an absorption peak in a wavelength range of 400 nm to 550 nm.

Examples of the anthraquinone-based coloring agent include (1) 2-anilino-1,3,4-trifluoroanthraquinone, (2) 2-(o-ethoxycarbonylanilino)-1,3,4-trifluoroanthraquinone, (3) 2-(p-ethoxycarbonylanilino)-1,3,4-trifluoroanthraquinone, (4) 2-(m-ethoxycarbonylanilino)-1,3,4-trifluoroanthraquinone, (5) 2-(o-cyanoanilino)-1,3,4-trifluoroanthraquinone, (6) 2-(p-cyanoanilino)-1,3,4-trifluoroanthraquinone, (7) 2-(m-cyanoanilino)-1,3,4-trifluoroanthraquinone, (8) 2-(o-nitroanilino)-1,3,4-trifluoroanthraquinone, (9) 2-(p-nitroanilino)-1,3,4-trifluoroanthraquinone, (10) 2-(m-nitroanilino)-1,3,4-trifluoroanthraquinone, (11) 2-(p-tert-butylanilino)-1,3,4-trifluoroanthraquinone, (12) 2-(o-methoxyanilino)-1,3,4-trifluoroanthraquinone, (13) 2-(2,6-diisopropylanilino)-1,3,4-trifluoroanthraquinone, (14) 2-(2,6-dichloroanilino)-1,3,4-trifluoroanthraquinone, (15) 2-(2,6-difluoroanilino)-1,3,4-trifluoroanthraquinone, (16) 2-(3,4-dicyanoanilino)-1,3,4-trifluoroanthraquinone, (17) 2-(2,4,6-tri(loloanilino)-1,3,4-trifluoroanthraquinone, (18) 2-(2,3,5,6-tetrachloroanilino)-1,3,4-trifluoroanthraquinone, (19) 2-(2,3,5,6-tetrafluoroanilino)-1,3,4-trifluoroanthraquinone, (20) 3-(2,3,4,5-tetrafluoroanilino)-2-butoxy-1,4-difluoroanthraquinone, (21) 3-(4-cyano-3-chloroanilino)-2-octyloxy-1,4-difluoroanthraquinone, (22) 3-(3,4-dicyanoanilino)-2-hexyloxy-1,4-difluoroanthraquinone, (23) 3-(4-cyano-3-chloroanilino)-1,2-dibutoxy-4-fluoroanthraquinone, (24) 3-(p-cyanoanilino)-2-phenoxy-1,4-difluoroanthraquinone, (25) 3-(p-cyanoanilino)-2-(2,6-diethylphenoxy)-1,4-difluoroanthraquinone, (26) 3-(2,6-dichloroanilino)-2-(2,6-dichlorophenoxy)-1,4-difluoroanthraquinone, (27) 3-(2,3,5,6-tetrachloroanilino)-2-(2,6-dimethoxyphenoxy)-1,4-difluoroanthraquinone, (28) 2,3-dianilino-1,4-difluoroanthraquinone, (29) 2,3-bis (p-tert-butylanilino)-1,4-difluoroanthraquinone, (30) 2,3-bis (p-methoxyanilino)-1,4-difluoroanthraquinone, (31) 2,3-bis (2-meth(xy-6-methylanilino)-1,4-difluoroanthraquinone, (32) 2,3-bis(2,6-diisopropylanilino)-1,4-difluoroanthraquinone, (33) 2,3-bis (2,4,6-trichloroanilino)-1,4-difluoroanthraquinone, (34) 2,3-bis(2,3,5,6-tetrachloroanilino)-1,4-difluoroanthraquinone, (35) 2,3-bis(2,3,5,6-tetrafluoroanilino)-1,4-difluoroanthraquinone, (36) 2,3-bis(p-cyanoanilino)-1-methoxyethoxy-4-fluoroanthraquinone, (37) 2-(2,6-dichloroanilino)-1,3,4- trichloroanthraquinone, (38) 2-(2,3,5,6-tetrafluoroanilino)-1,3,4-trichloroanthraquinone, (39) 3-(2,6-dichloroanilino)-2-(2,6-dichlorophenoxy)-1,4-dichloroanthraquinone, (40) 2-(2,6-dichloroanilino) anthraquinone, (41) 2-(2,3,5,6-tetrafluoroanilino)anthraquinone, (42) 3-(2,6-dichloroanilino)-2-(2,6-dichlorophenoxy) anthraquinone, (43) 2,3-bis(2-methoxy-6-methylanilino)-1,4-dichloroanthraquinone, (44) 2,3-bis(2,6-diisopropylanilino) anthraquinone, (45) 2-butylamino-1,3,4-trifluoroanthraquinone, (46) 1,4-bis(n-butylamino)-2,3-difluoroanthraquinone (47) 1,4-bis (n-octylamino)-2,3-difluoroanthraquinone, (48) 1,4-bis (hydroxyethylamino)-2,3-difluoroanthraquinone, (49) 1,4-bis (cyclohexylamino)-2,3-difluoroanthraquinone, (50) 1,4-bis (cyclohexylamino)-2-octyloxy-3-fluoroanthraquinone, (51) 1,2,4-tris(2,4-dimethoxyphenoxy)-3-fluoroanthraquinone, (52) 2,3-bis(phenylthio)-1-phenoxy-4-fluoroanthraquinone, (53) 1,2,3,4-tetra(p-methoxyphenoxy)anthraquinone, and the like.

By blending such an anthraquinone-based coloring agent, it is possible to absorb light having a wavelength of 450 nm to 600 nm out of light incident on the specific wavelength absorption layer 11. It is preferable to have an absorption peak in a wavelength range of 500 nm to 600 nm.

Examples of the perylene-based coloring agent include N,N'-dimethylperylene-3,4,9,10-tetracarboxylic diimide, N,N'-diethylperylene-3,4,9,10-tetracarboxylic diimide, N,N'-bis (4-methoxyphenyl)-perylene-3,4,9,10-tetracarboxylic diimide, N,N'-bis (4-ethoxyphenyl)-perylene-3,4,9,10-tetracarboxylic diimide, N,N'-bis(4-chlorophenyl)-perylene-3,4,9,10-tetracarboxylic diimide, and the like, and particularly preferable examples thereof include N,N'-bis(3,5-dimethylphenyl)-perylene-3,4,9,10-tetracarboxylic diimide and the like.

By blending such a perylene-based coloring agent, it is possible to absorb light having a wavelength of 400 nm to 800 nm out of the light incident on the specific wavelength absorption layer 11. It is preferable to have an absorption peak in a wavelength range of 600 nm to 780 nm.

By blending the light absorbing agent as described above, it is possible to absorb light in a specific wavelength range. Therefore, for example, the user can clearly recognize the outline of an object or a person in a mounted state, and can enhance safety.

A content of the light absorbing agent (total of each light absorbing agent) in the specific wavelength absorption layer 11 is preferably 0.001 wt % to 5 wt %, and more preferably 0.003 wt % to 4 wt %. With this, it is possible to reliably exhibit the above effect. In a case where the content is too small, the effect as a light absorbing agent may not be sufficiently obtained. On the other hand, in a case where the content is too large, the light absorbing agent tends to be easily aggregated.

<Ultraviolet Absorbing Agent>

The ultraviolet absorbing agent absorbs ultraviolet rays (light having a wavelength range of 100 nm to 420 nm).

The ultraviolet absorbing agent is not particularly limited, but examples thereof include a triazine-based compound, a benzophenone-based compound, a benzotriazole-based compound, and a cyanoacrylate-based compound, and one or two or more of these can be used in combination. Among these, a triazine-based compound is particularly preferably used. With this, it is possible to prevent or suppress deterioration of the specific wavelength absorption layer 11 (polycarbonate and light absorbing agent) due to ultraviolet rays and to enhance weather resistance of the optical sheet 1.

Examples of the triazine-based compound include 2-mono (hydroxyphenyl)-1,3,5-triazine compound, 2,4-bis (hydroxyphenyl)-1,3,5-triazine compound, and 2,4,6-tris (hydroxyphenyl)-1,3,5-triazine compound, and specific examples thereof include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis (2-hydroxy-4-butoxyphenyl)-6-(2,4-dibutoxyphenyl)-1,3-5-triazine, 2,4,6-tris(2-hydroxy-4-methoxyphenyl)nyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4 6-tris(2-hydroxy-4-propoxyethoxyphenyl)-1,3,5-triazine, 2,4,6-tris (2-hydroxy-4-methoxycarbonylpropyloxyphenyl)-1,3,5-triazine, 2,4,6-tris (2-hydroxy-4-ethoxycarbonylethyloxyphenyl)-1,3,5-triazine, 2,4,6-tris (2-hydroxy-4-(1-(2-ethoxyhexyloxy)-1-oxopropan-2-yloxy)phenyl)-1,3,5-triazine, 2,4,6-tris (2-hydroxy-3-methyl-4-methoxyphenyl)-1,3,5-triazine, 2,4,6-tris (2-hydroxy-3-methyl-4-ethoxyphenyl)-1,3,5-triazine, 2,4,6-tris (2-hydroxy-3-methyl-4-propoxyphenyl)-1,3,5-triazine, 2,4,6-tris (2-hydroxy-3-methyl-4-butoxyphenyl)-1,3,5-triazine, 2,4,6-tris (2-hydroxy-3-methyl-4-hexyloxyphenyl)-1,3,5-triazine, 2,4,6-tris (2-hydroxy-3-Methyl-4-octyloxyphenyl)-1,3,5-triazine, 2,4,6-tris (2-hydroxy-3-methyl-4-dodecyloxyphenyl)-1,3,5-triazine, 2,4,6-tris 2-hydroxy-3-methyl-4-benzyloxyphenyl)-1,3,5-triazine, 2,4,6-tris (2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris (2-hydroxy-3-methyl-4-methoxycarbonylpropyloxyphenyl)-1,3,5-triazine, 2,4,6-tris (2-hydroxy-3-methyl-4-ethoxycarbonylethyloxyphenyl)-1,3,5-triazine, 2,4,6-tris(2-hydroxy Ci-3-methyl-4-(1-(2-ethoxyhexyloxy)-1-oxopropan-2-yloxy)phenyl)-1,3,5-triazine, and the like. Examples of commercially available products of triazine-based ultraviolet absorbing agents include "Tinuvin 1577", "Tinuvin 460", "Tinuvin 477" (manufactured by BASF Japan), "ADEKA STAB LA-F70" (manufactured by ADEKA), and the like.

The specific wavelength absorption layer 11 further includes an ultraviolet absorbing agent that absorbs light in the wavelength range of 100 nm to 420 nm or less as described above, and thus it is possible to absorb light having a wavelength of 100 nm to 420 nm out of light incident on the specific wavelength absorption layer 11. With this, it is possible to prevent or suppress deterioration of the specific wavelength absorption layer 11 (polycarbonate and light absorbing agent) due to ultraviolet rays and to enhance weather resistance of the optical sheet 1.

A content of the ultraviolet absorbing agent in the specific wavelength absorption layer 11 is preferably 0.05 wt % to 8 wt %, and more preferably 0.07 wt % to 6 wt %. With this, it is possible to reliably exhibit the above effect. In a case where the content is too small, the effect as an ultraviolet absorbing agent may not be sufficiently obtained. On the other hand, in a case where the content is too large, the ultraviolet absorbing agent tends to be easily aggregated.

Here, the content of the ultraviolet absorbing agent in the specific wavelength absorption layer 11 is preferably larger than the content of the light absorbing agent in the specific wavelength absorption layer 11. With this, the optical sheet 1 can absorb light in a specific wavelength range out of visible light, and can also absorb ultraviolet rays. In particular, the light absorbing agent is relatively easily deteriorated by ultraviolet rays, but this deterioration can be prevented. In addition, since the content of the ultraviolet absorbing agent in the specific wavelength absorption layer 11 is larger than the content of the light absorbing agent in the specific wavelength absorption layer 11, the light absorbing agent can more reliably prevent deterioration due to ultraviolet rays.

A ratio A/B of the content A of the light absorbing agent in the specific wavelength absorption layer 11 to the content B of the ultraviolet absorbing agent in the specific wavelength absorption layer 11 is preferably 0.000125 to 0.625, and more preferably 0.00015 to 0.4. With this, the effect of the present invention is more remarkably obtained.

A thickness of the specific wavelength absorption layer 11 is not particularly limited, but is preferably 0.05 mm to 1.5 mm, and more preferably 0.3 mm to 0.7 mm. With this, it is possible to enhance handleability and to prevent the optical component as a whole from being unnecessarily thick.

In addition, the specific wavelength absorption layer 11 may be manufactured by stretching or may be manufactured without stretching, but the stretching degree is preferably 10% or less, and more preferably 5% or less. With this, it is possible to prevent or suppress occurrence of color unevenness, unevenness of a light absorbing agent, and unevenness of an ultraviolet absorbing agent during stretching.

In a case where a melting point of polycarbonate is denoted by T1 and a melting point of a light absorbing agent is denoted by T2, it is preferable that T1<T2 is satisfied. With this, in a case where the polycarbonate in a molten state and the light absorbing agent are mixed with each other, it is possible to prevent the light absorbing agent from being the light absorber can be prevented from being changed in quality or discolored by heat.

In a case where the melting point of polycarbonate is denoted by T1 and the melting point of the ultraviolet absorbing agent is denoted by T3, it is preferable that T1<T3 is satisfied. With this, in a case where the polycarbonate in a molten state and the light absorbing agent are mixed with each other, it is possible to prevent the ultraviolet absorbing agent from being changed in quality or discolored by heat.

The melting point T1 of the polycarbonate is preferably 250° C. to 400° C., and more preferably 270° C. to 350° C.

The melting point T2 of the light absorbing agent is preferably 300° C. to 400° C., and more preferably 330° C. to 360° C. In addition, the melting point T3 of the ultraviolet absorbing agent is preferably 310° C. to 370° C., and more preferably 340° C. to 360° C. By setting the melting points T1 to T3 within the above numerical value range, it is possible to reliably exhibit the above effect.

The light absorbing agent may be a coloring agent different from the coloring agents exemplified above. The coloring agent is not particularly limited, and examples thereof include a pigment, a dye, and the like, and these can be used alone or used by being mixed together. In addition, it is possible to use the coloring agent by being mixed with those described above.

The pigment is not particularly limited, and examples thereof include phthalocyanine-based pigments such as phthalocyanine green and phthalocyanine blue, azo-based pigments such as fast yellow, disazo yellow, condensed azo yellow, penzoimidazolone yellow, dinitroaniline orange, penzimidazolone orange, toluidine red, permanent carmine, permanent red, naphthol red, condensed azo red, benzimidazolone carmine, and benzimidazolone brown, anthraquinone-based pigments such as anthrapyrimidine yellow and anthraquinonyl red, azomethine-based pigments such as copper azomethine yellow, quinophthalone-based pigments such as quinophthalone yellow, isoindoline-based pigments such as isoindoline yellow, nitroso-based pigments such as nickel dioxime yellow, perinone-based pigments such as perinone orange, quinacridone-based pigments such as quinacridone magenta, quinacridone maroon, quinacridone scarlet, and quinacridone red, perylene red, perylene-based pigments such as perylene maroon, pyrrolopyrrole-based pigments such as diketopyrrolopyrrole red, organic pigments such as dioxazine-based pigments such as dioxazine violet, carbon-based pigments such as carbon black, lamp black, furnace black, ivory black, graphite, and fullerene, chromate-based pigments such as chrome yellow and molybdate orange, sulfide-based pigments such as cadmium yellow, cadmium lithopone yellow, cadmium orange, cadmium lithopone orange, silver vermilion, cadmium red, cadmium lithopone red, and sulfidation, oxide-based pigments such as ocher, titanium yellow, titanium barium nickel yellow, red iron, lead red, amber, brown iron oxide, zinc iron chrome brown, chromium oxide, cobalt green, cobalt chrome green, titanium cobalt green, cobalt blue, cerulean blue, cobalt aluminum chrome blue, and iron black, manganese ferrite black, cobalt ferrite black, copper chromium black, and copper chromium manganese black, hydroxide-based pigments such as viridian, ferrocyanide-based pigments such as Prussian blue, silicate-based pigments such as ultramarine blue, phosphate-based pigments such as cobalt violet and mineral violet, and inorganic pigments such as others (for example, cadmium sulfide, cadmium selenide, and the like), and the like, and one or two or more of these can be used in combination.

The dye is not particularly limited, and examples thereof include metal complex coloring agent, cyan-based coloring agent, xanthene-based coloring agent, azo-based coloring agent, hibiscus coloring agent, blackberry coloring agent, raspberry coloring agent, pomegranate juice coloring agent, chlorophyll coloring agent, porphyrin-based compounds such as tetraazoporphyrin compound, merocyanine dye, and the like, and one or two or more of these can be used in combination.

Among these, the light absorbing agent preferably contains at least one selected from the group consisting of a phthalocyanine-based pigment, a porphyrin compound, and a merocyanine dye. With this, the effect of the present invention is more remarkably obtained.

Subsequently, a method for manufacturing an optical sheet and a method for manufacturing an optical component will be described. Hereinafter, a case where an optical sheet is manufactured using an extrusion method will be described as an example.

(Method for Manufacturing Optical Sheet)

First, an optical sheet manufacturing apparatus used in the present manufacturing method will be described.

Figure 3:
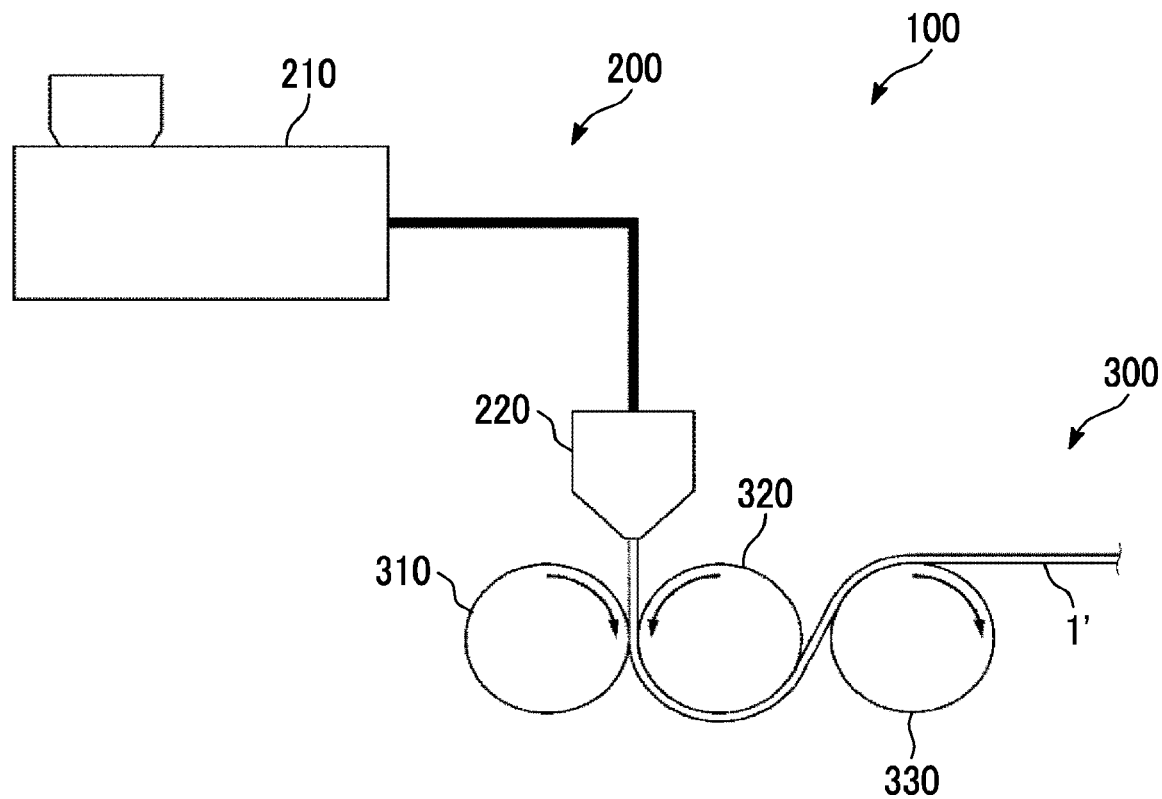
FIG. 3 is a side view schematically showing an optical sheet manufacturing apparatus for manufacturing the optical sheet shown in FIG. 1.
Figure 4:
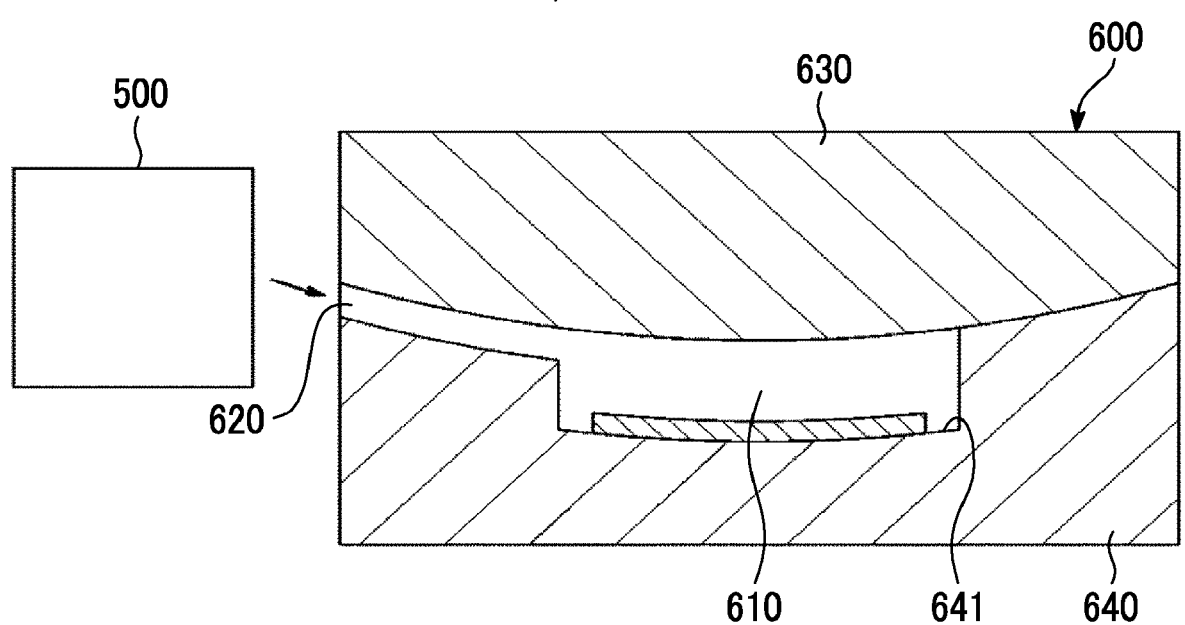
FIG. 4 is a sectional view schematically showing an optical component manufacturing apparatus for manufacturing the optical sheet optical component shown in FIG. 1.

FIG. 3 is a side view schematically showing an optical sheet manufacturing apparatus for manufacturing the optical sheet shown in FIG. 1. FIG. 4 is a sectional view schematically showing an optical component manufacturing apparatus for manufacturing the optical sheet optical component shown in FIG. 1. In the following description, the upper side in FIG. 4 is referred to as "upper", and the lower side is referred to as "lower".

The optical sheet manufacturing apparatus 100 shown in FIG. 3 includes a sheet supply unit 200 and a sheet molding unit 300.

In the present embodiment, the sheet supply unit 200 includes an extruder 210 and a T-die 220 connected to a molten resin discharge unit of the extruder 210 via a pipe. A belt-shaped sheet 1' in a molten state or a softened state is supplied to the sheet molding unit 300 by the T-die 220.

The T-die 220 is an extrusion forming unit that extrudes the sheet 1' in a molten state or a softened state by an extrusion method in a state of a belt-shaped sheet. A constituent material constituting the optical sheet 1 described above is loaded in the T-die 220 in a molten state, and by extruding the material in the molten state from the T-die 220, the belt-shaped sheet 1' is continuously fed.

The sheet molding unit 300 includes a touch roll 310, a cooling roll 320, and a post-stage cooling roll 330. Each of these rolls is configured to rotate independently by a motor (driving means) (not illustrated), and is continuously fed by being cooled by the rotation of these rolls. By continuously feeding the sheet 1' into the sheet molding unit 300, a surface of the sheet 1' is flattened, and the sheet 1' is set to a desired thickness and cooled. The cooled sheet 1' is cut into a predetermined length to obtain an optical sheet 1.

The optical sheet of the present embodiment is manufactured by the optical sheet manufacturing method using the optical sheet manufacturing apparatus 100 as described above.

Manufacturing of the optical sheet includes an extrusion step, a molding step, and a cooling step.

First, a belt-shaped sheet 1' in a molten state or a softened state is extruded (an extrusion step). In this extrusion step, the constituent material of the optical sheet 1 (polycarbonate, light absorbing agent, ultraviolet absorbing agent, and the like) are loaded into the extruder 210. In addition, the constituent material of the optical sheet 1 is in a molten or softened state in the extruder 210. Here, as described above, in the present invention, since the polycarbonate has a viscosity average molecular weight Mv of 20,000 to 30,000, the polycarbonate, the light absorbing agent, and the ultraviolet absorbing agent are in a sufficiently mixed state. By extruding these in a sufficiently mixed state, in the optical sheet 1 obtained through a molding step and a cooling step described below, it is possible to prevent the light absorbing agent and the ultraviolet absorbing agent from being excessively aggregated.

Subsequently, the surface of the sheet 1' is flattened, and the sheet 1' is set to a predetermined thickness (molding step). The present step is performed between the touch roll 310 and the cooling roll 320.

Subsequently, the surface of the sheet 1' is cooled (cooling step). The present step is performed between the cooling roll 320 and the post-stage cooling roll 330.

It is possible to obtain the optical sheet 1 through the above steps. Subsequently, a method for manufacturing an optical component will be described.

(Method for Manufacturing Optical Component)

First, an optical component manufacturing apparatus used in the present manufacturing method will be described.

The optical component manufacturing apparatus 400 shown in FIG. 4 includes a resin supply unit 500 and a mold 600. The resin supply unit 500 is filled with the above-described polycarbonate. The mold 600 has a cavity 610 and a supply port 620 communicating inside and outside the cavity 610. In addition, the mold 600 includes an upper member 630 and a lower member 640, and in a state where these components are assembled, the mold 600 that defines the optical component manufacturing apparatus 400 is configured.

The optical component manufacturing apparatus of the present embodiment is manufactured by a manufacturing method of the optical sheet manufacturing apparatus using the optical component manufacturing apparatus 400 as described above.

The method for manufacturing an optical component includes an optical sheet arranging step and a lens material supplying step.

First, in a state where the upper member 630 and the lower member 640 are disassembled, the optical sheet 1 is arranged on a bottom surface 641 of the lower member 640 (optical sheet arranging step). The bottom surface 641 is a curved concave surface, and with this, it is possible to form a curved surface on the lens 4. In addition, the optical sheet 1 has flexibility, and thus is arranged according to the shape of the bottom surface 641.

Subsequently, the upper member 630 and the lower member 640 are in an assembled state, and a lens material in a molten state or a softened state is poured through the supply port 620 (lens material supply step). By cooling the lens material in a molten state or a softened state, it is possible to obtain a laminate in which the optical sheet 1 and the lens are laminated.

In the above description, a so-called sheet insert method has been described as an example. However, the present invention is not limited thereto. For example, the optical sheet 1 may be laminated on the molded lens via an adhesive.

Second Embodiment

Figure 6:
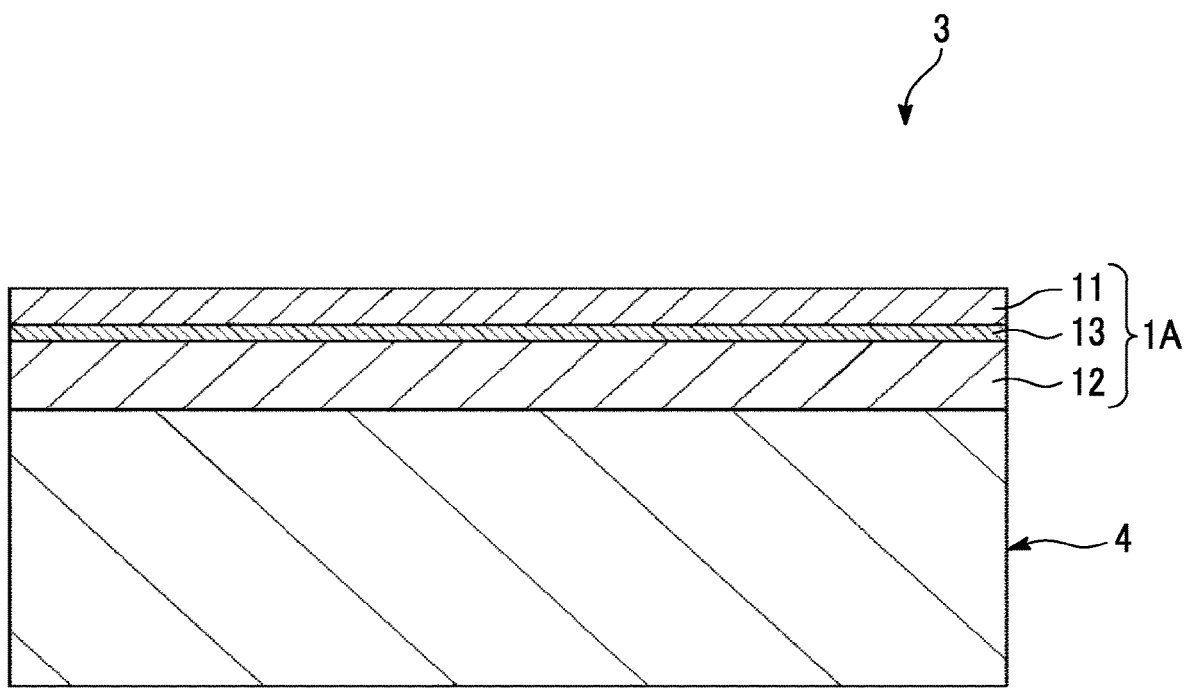
FIG. 6 is a sectional view of an optical component including an optical sheet (second embodiment) of the present invention.

FIG. 6 is a sectional view of an optical component including the optical sheet (second embodiment) of the present invention.

Hereinafter, a second embodiment of the optical sheet and the optical component of the present invention will be described with reference to the drawing, but the description will be focused on the differences from the above-described embodiment, and the description of the same matters will be omitted.

The present embodiment is the same as the first embodiment except that a polarized film is provided.

(Polarized Film)

As shown in FIG. 6, the optical sheet 1A further includes a polarized film 12 and an adhesive layer 13. The polarized film 12 is laminated on the specific wavelength absorption layer 11 via the adhesive layer 13. In the illustrated configuration, the polarized film 12 is arranged on a lens 4 side.

The polarized film 12 has a function of extracting linearly polarized light having a polarization plane in one predetermined direction from incident light (natural light that is not polarized). With this, the incident light incident on the eye via the optical sheet 1 is polarized.

A polarization degree of the polarized film 12 is not particularly limited, but is preferably 50% to 100%, and more preferably 80% to 100%, for example. In addition, visible light transmittance of the polarized film 12 is not particularly limited, but is preferably 10% to 80%, and more preferably 20% to 50%, for example.

The constituent material of the polarized film 12 is not particularly limited as long as the material has the above function. Examples thereof include a material obtained by adsorbing and dyeing a dichroic substance such as iodine or dichroic dye on a polymer film configured of polyvinyl alcohol (PVA), partially formalized polyvinyl alcohol, polyethylene vinyl alcohol, polyvinyl butyral, polycarbonate, a partially saponified product of ethylene-vinyl acetate copolymer, and the like, and performing uniaxial stretching, a polyene-based oriented film such as a dehydrated product of polyvinyl alcohol and a dechlorinated product of polyvinyl chloride, and the like.

Among these, the polarized film 12 is preferably a film obtained by adsorbing and dyeing iodine or a dichroic dye on a polymer film containing polyvinyl alcohol (PVA) as a main material, and performing uniaxial stretching. Polyvinyl alcohol (PVA) is a material that is excellent in transparency, heat resistance, affinity for iodine or a dichroic dye which is a dyeing agent, and orientation during stretching. Therefore, the polarized film 12 mainly formed of PVA has excellent heat resistance and excellent polarizing function.

Examples of the dichroic dye include chloratin fast red, congo red, brilliant blue 6B, benzoperpurine, chlorazole black BH, direct blue 2B, diamine green, chrysophenone, sirius yellow, direct fast red, acid black, and the like.

A thickness of the polarized film 12 is not particularly limited, and is preferably 5 μm to 60 μm, and more preferably 10 μm to 40 μm, for example.

The adhesive (or pressure-sensitive adhesive) constituting the adhesive layer 13 is not particularly limited, and examples thereof include an acrylic adhesive, a urethane adhesive, an epoxy adhesive, a silicone adhesive, and the like.

Among these, the urethane-based adhesive is preferable. With this, it is possible to make transparency, adhesion strength, and durability of the adhesive layer 13 further excellent, and to make properties of following a change in shape particularly excellent.

According to this embodiment, the same effects as those of the first embodiment can be obtained, and the present embodiment has a polarization function.

The preferable embodiments of the present invention have been described above, but the present invention is not limited to the above-description, and modifications, improvements, and the like within a scope in which the object of the present invention can be achieved are included in the present invention.

For example, each unit constituting the optical sheet of the present invention can be replaced with an arbitrary constituent element exhibiting the same function.

In addition, the optical sheet of the present invention may have an arbitrary constituent component in addition to the above-described configuration.

More specifically, for example, the optical sheet of the present invention may include a protective layer for protecting a surface, an intermediate layer, a power adjustment layer for adjusting the power as a lens, and the like.

EXAMPLES

Hereinafter, the present invention will be described more specifically based on examples.

1. Examination of Optical Sheet 1-1. Preparation of Optical Sheet

Example 1

[1] First, 100 parts by mass of a bisphenol A-type polycarbonate ("Lupilon E2000F E5111" manufactured by Mitsubishi Gas Chemical Company), 0.04 parts by mass of a light absorbing agent ("FDG-005" manufactured by Yamada Chemical Industries, Ltd.), and 0.4 parts by mass of an ultraviolet absorbing agent ("ADEKA STAB LA-31G" manufactured by ADEKA Corporation) were stirred and mixed to prepare an optical sheet forming material.

[2] Subsequently, the optical sheet forming material was accommodated in an extruder 210 of the optical sheet manufacturing apparatus 100 shown in FIG. 3, melted, and extrusion-molded by a T-die 220 to obtain a sheet material. The sheet material was cooled and molded by a sheet molding unit 300, and cut into a rectangular shape having an average thickness of 0.3 mm and a size of 500 mm×500 mm in plan view to prepare an optical sheet.

The viscosity average molecular weight Mv of the polycarbonate is 27,000, the melting point T1 is 250° C., the melt flow rate measured in accordance with JISK7210 is 5.3 g/10 min, and the water absorption rate measured by Aquatrac 3E (manufactured by Brabender Corporation) was 0.05%. In addition, the melting point T2 of the light absorbing agent was 440° C. In addition, the melting point T3 of the ultraviolet absorbing agent was 200° C.

Example 2

An optical sheet of Example 2 was obtained in the same manner as in Example 1 except that the configuration of the optical sheet was changed as shown in Table 1.

Example 3

An optical sheet of Example 3 was obtained in the same manner as in Example 1 except that the configuration of the optical sheet was changed as shown in Table 1.

Example 4

An optical sheet of Example 4 was obtained in the same manner as in Example 1 except that the configuration of the optical sheet was changed as shown in Table 1.

Example 5

An optical sheet of Example 5 was obtained in the same manner as in Example 1 except that the configuration of the optical sheet was changed as shown in Table 1.

Example 6

An optical sheet of Example 6 was obtained in the same manner as in Example 1 except that the configuration of the optical sheet was changed as shown in Table 1.

Example 7

An optical sheet of Example 7 was obtained in the same manner as in Example 1 except that the configuration of the optical sheet was changed as shown in Table 1.

Example 8

An optical sheet of Example 8 was obtained in the same manner as in Example 1 except that the configuration of the optical sheet was changed as shown in Table 1.

Example 9

An optical sheet of Example 9 was obtained in the same manner as in Example 1 except that the configuration of the optical sheet was changed as shown in Table 1.

Example 10

An optical sheet of Example 10 was obtained in the same manner as in Example 1 except that the configuration of the optical sheet was changed as shown in Table 1.

Example 11

An optical sheet of Example 11 was obtained in the same manner as in Example 1 except that the configuration of the optical sheet was changed as shown in Table 1.

Example 12

An optical sheet of Example 12 was obtained in the same manner as in Example 1 except that the configuration of the optical sheet was changed as shown in Table 1.

Example 13

An optical sheet of Example 13 was obtained in the same manner as in Example 1 except that the configuration of the optical sheet was changed as shown in Table 1.

Comparative Example 1

An optical sheet of Comparative Example 1 was obtained in the same manner as in Example 1 except that the configuration of the optical sheet was changed as shown in Table 1.

Comparative Example 2

An optical sheet of Comparative Example 2 was obtained in the same manner as in Example 1 except that the configuration of the optical sheet was changed as shown in Table 1.

Comparative Example 3

An optical sheet of Comparative Example 3 was obtained in the same manner as in Example 1 except that the configuration of the optical sheet was changed as shown in Table 1.

Comparative Example 4

An optical sheet of Comparative Example 4 was obtained in the same manner as in Example 1 except that the configuration of the optical sheet was changed as shown in Table 1.

In Table 1, a1 represents polycarbonate ("E2000FN E5100" manufactured by Mitsubishi Gas Chemical Company), a2 represents polycarbonate ("H3000" manufactured by Mitsubishi Gas Chemical Company), a3 represents polycarbonate ("200-3NAT" manufactured by Sumika Polycarbonate Limited), a4 represents polycarbonate ("S2000" manufactured by Mitsubishi Gas Chemical Company), and a5 represents polycarbonate ("1300-03" manufactured by EG Corporation).

In addition, in Table 1, b1 represents a light absorbing agent ("FDG-005" manufactured by Yamada Chemical Industry Co., Ltd.), b2 represents a light absorbing agent ("FDG-002" manufactured by Yamada Chemical Industry Co., Ltd.), b3 represents a light absorbing agent ("FDB-001" manufactured by Yamada Chemical Industry Co., Ltd.), b4 represents a light absorbing agent ("FDR-002" manufactured by Yamada Chemical Industry Co., Ltd.), and b5 represents a light absorbing agent ("FDR-005" manufactured by Yamada Chemical Industry Co., Ltd.)

In addition, in Table 1, c represents an ultraviolet absorbing agent ("ADEKA STAB LA-31G" manufactured by ADEKA Corporation)

1-2. Evaluation

The optical sheet of each example and each comparative example was evaluated by the following methods.

(Aggregability Evaluation)

Observation was performed using a digital microscope ("VHX-1000" manufactured by Keyence Corporation), a size of the aggregate was measured, and evaluation was performed as follows.

A: The size of the aggregate is less than 0.05 mm$^2$.

B: The size of the aggregate is equal to or more than 0.05 mm$^2$ and less than 0.1 mm$^2$.

C: The size of the aggregate is equal to or more than 0.1 mm$^2$ and less than 0.5 mm$^2$.

D: The size of the aggregate is equal to or more than 0.5 mm$^2$.

(Strength Evaluation)

Charpy impact strength was measured in accordance with ISO179-1 and ISO179-2, and evaluated as follows.

A: Equal to or more than 80 KJ/m$^2$.

B: Equal to or more than 50 KJ/m$^2$ and less than 80 KJ/m$^2$.

C: Equal to or more than 25 KJ/m$^2$ and less than 50 KJ/m$^2$.

D: Less than 25 KJ/m$^2$.

(Weather Resistance Evaluation)

A xenon lamp (7.5 kw, output: 1.728 MJ/m$^2$) (light source filter: daylight filter, irradiance: broadband (300 to 400 nm), 60±2 W/m$^2$) was irradiated for 8 hours, and a yellowing degree (ΔYI) was evaluated as follows.

A: Appearance was not changed at ΔYI of less than 1.0.

B: Appearance was changed a little at ΔYI of equal to or more than 1.0 and less than 2.0.

C: A change in appearance was observed at ΔYI of equal to or more than 2.0 and less than 3.0.

D: A change in appearance was remarkably observed at ΔYI of equal to or more than 3.0.

Table 1 below shows evaluation results of the optical sheet of each example and each comparative example obtained as described above.

TABLE 1

| | | | Example 1 | Example 2 | Example 3 | Example 4 | Example 5 | Example 6 |
|---|---|---|---|---|---|---|---|---|
| Specific wavelength absorption layer | Polycarbonate | Type | a1 | a2 | a3 | a4 | a1 | a1 |
| | | Content (wt %) | 100 | 100 | 100 | 100 | 100 | 100 |
| | | Viscosity average molecular weight (Mv) | 2700 | 20000 | 30000 | 23000 | 27000 | 27000 |
| | | Water absorption rate (%) | 0.05 | 0.05 | 0.05 | 0.05 | 0.05 | 0.05 |
| | | Melt flow rate (g/10 min) | 5.3 | 28 | 3 | 9 | 5.3 | 5.3 |
| | | Melting point T1 (° C.) | 250 | 250 | 250 | 250 | 250 | 250 |
| | Light absorbing agent | Type | b1 | b1 | b1 | b1 | b2 | b3 |
| | | Content (wt %) | 0.04 | 0.04 | 0.04 | 0.04 | 0.04 | 0.04 |
| | | Melting point T2 (° C.) | 440 | 440 | 440 | 440 | 300 | 370 |
| | Ultraviolet absorbing agent | Type | c | c | c | c | c | c |
| | | Content (wt %) | 0.4 | 0.4 | 0.4 | 0.4 | 0.4 | 0.4 |
| | | Melting point T3 (° C.) | 200 | 200 | 200 | 200 | 200 | 200 |
| | | | 0.1 | 0.1 | 0.1 | 0.1 | 0.1 | 0.1 |
| Evaluation | Aggregability | | A | A | B | A | A | A |
| | Strength | | A | B | A | A | A | A |
| | Weather resistance | | A | A | A | A | A | A |

| | | | Example 7 | Example 8 | Example 9 | Example 10 | Example 11 | Example 12 |
|---|---|---|---|---|---|---|---|---|
| Specific wavelength absorption layer | Polycarbonate | Type | a1 | a1 | a1 | a1 | a1 | a1 |
| | | Content (wt %) | 100 | 100 | 100 | 100 | 100 | 100 |
| | | Viscosity average molecular weight (Mv) | 27000 | 27000 | 27000 | 27000 | 27000 | 27000 |
| | | Water absorption rate (%) | 0.02 | 0.05 | 0.02 | 0.05 | 0.05 | 0.05 |
| | | Melt flow rate (g/10 min) | 5.3 | 5.3 | 5.3 | 5.3 | 5.3 | 5.3 |
| | | Melting point T1 (° C.) | 250 | 250 | 250 | 250 | 250 | 250 |
| | Light absorbing agent | Type | b1 | b3 | b1 | b4 | b5 | b4 |
| | | Content (wt %) | 0.04 | 0.03 | 5 | 0.04 | 0.04 | 5 |
| | | Melting point T2 (° C.) | 440 | 370 | 440 | 440 | 440 | 440 |
| | Ultraviolet absorbing agent | Type | c | c | c | c | c | c |
| | | Content (wt %) | 0.4 | 0.05 | 8 | 0.4 | 0.4 | 8 |
| | | Melting point T3 (° C.) | 200 | 200 | 200 | 200 | 200 | 200 |
| | | | 0.1 | 0.6 | 0.625 | 0.1 | 0.1 | 0.625 |
| Evaluation | Aggregability | | B | A | B | A | B | A |
| | Strength | | A | A | A | A | A | A |
| | Weather resistance | | A | A | A | A | A | A |

| | | | Example 13 | Comparative Example 1 | Comparative Example 2 | Comparative Example 3 | Comparative Example 4 |
|---|---|---|---|---|---|---|---|
| Specific wavelength absorption layer | Polycarbonate | Type | a1 | a1 | a5 | a1 | a5 |
| | | Content (wt %) | 100 | 100 | 100 | 100 | 100 |
| | | Viscosity average molecular weight (Mv) | 27000 | 19000 | 31000 | 19000 | 31000 |
| | | Water absorption rate (%) | 0.05 | 0.01 | 0.05 | 0.01 | 0.05 |
| | | Melt flow rate (g/10 min) | 5.3 | 5.3 | 2 | 5.3 | 2 |
| | | Melting point T1 (° C.) | 250 | 250 | 250 | 250 | 250 |
| | Light absorbing agent | Type | b5 | b1 | b1 | b1 | b1 |
| | | Content (wt %) | 5 | 0.04 | 0.04 | 0.04 | 0.04 |
| | | Melting point T2 (° C.) | 440 | 440 | 440 | 440 | 440 |
| | Ultraviolet absorbing agent | Type | c | c | c | — | c |
| | | Content (wt %) | 8 | 0.4 | 0.4 | — | 0.004 |
| | | Melting point T3 (° C.) | 200 | 200 | 200 | — | 200 |
| | | | 0.625 | 0.1 | 0.1 | — | 10 |
| Evaluation | Aggregability | | B | C | D | C | D |
| | Strength | | A | A | A | A | A |
| | Weather resistance | | A | A | A | D | C |

As shown in Table 1, the optical sheet in each example exhibited strength equal to or higher than that of each comparative example, and there was obtained a result in which formation of an aggregate in each comparative example was suppressed.

2. Examination of Weather Resistance of Light Absorbing Agent Itself 2-1. Preparation of Optical Sheet Example A

[1] First, 100 parts by mass of an acrylic resin ("SUMIPEX MG5" manufactured by Sumitomo Chemical Co., Ltd.), 0.04 parts by mass of a light absorbing agent ("FDG-005" manufactured by Yamada Chemical Industry Co., Ltd.), and 0.4 parts by mass of an ultraviolet absorbing agent ("ADEKA STAB LA-31G" manufactured by ADEKA Corporation) were stirred and mixed to prepare an optical sheet forming material.

[2] Subsequently, the optical sheet forming material was accommodated in the extruder 210 of the optical sheet manufacturing apparatus 100 shown in FIG. 3, melted, and extrusion-molded by the T-die 220 to obtain a sheet material. The sheet material was cooled and molded by a sheet molding unit 300, and cut into a rectangular shape having an average thickness of 0.3 mm and a size of 500 mm×500 mm in plan view to prepare an optical sheet.

Example B

An optical sheet of Example B was obtained in the same manner as in Example A, except that the configuration of the optical sheet was changed as shown in Table 2.

Example C

An optical sheet of Example C was obtained in the same manner as in Example A, except that the configuration of the optical sheet was changed as shown in Table 2.

Example D

An optical sheet of Example D was obtained in the same manner as in Example A, except that the configuration of the optical sheet was changed as shown in Table 2.

Example E

An optical sheet of Example E was obtained in the same manner as in Example A, except that the configuration of the optical sheet was changed as shown in Table 2.

Comparative Example A

An optical sheet of Comparative Example A was obtained in the same manner as in Example A, except that the configuration of the optical sheet was changed as shown in Table 2.

In Table 2, b1 represents a light absorbing agent ("FDG-005" manufactured by Yamada Chemical Industry Co., Ltd.), and in Table 1, b2 represents a light absorbing agent ("FDG-002" manufactured by Yamada Chemical Industry Co., Ltd.).

In addition, in Table 2, c represents an ultraviolet absorbing agent ("ADEKA STAB LA-31G" manufactured by ADEKA Corporation).

2-2. Evaluation

The optical sheets of each example and each comparative example were evaluated by the following methods.

(Weather Resistance Evaluation of Light Absorbing Agent)

Using a UV tester ("SUV-W161" manufactured by Iwasaki Electric Co., Ltd.), each optical sheet is irradiated with ultraviolet light for 48 hours at an irradiation amount of 150 mW/cm$^2$, and then transmittance of a peak top of the light absorbing agent was measured with a spectrophotometer. The difference between the peak top transmittance of the light absorbing agent before the test and the peak top transmittance of the light absorbing agent after the test was calculated and evaluated as follows.

A: Difference in transmittance is less than 3%

B: Difference in transmittance is equal to or more than 3% and less than 5%

C: Difference in transmittance is equal to or more than 5% and less than 10%

D: Difference in transmittance is equal to or more than 10%

Table 2 below shows the evaluation result of the optical sheet of each example and each comparative example obtained as described above.

TABLE 2

| | | Example A | Example B | Example C | Example D | Example E | Comparative Example A |
|---|---|---|---|---|---|---|---|
| Light absorbing agent | Type | b1 | b1 | b1 | b2 | b1 | b1 |
| | Content (wt %) | 0.04 | 0.001 | 5 | 0.04 | 0.005 | 0.04 |
| | Melting point T2 (° C.) | 440 | 440 | 440 | 440 | 440 | 440 |
| Ultraviolet absorbing agent | Type | c | c | c | c | c | — |
| | Content (wt %) | 0.4 | 8 | 8 | 0.4 | 0.04 | — |
| | Melting point T3 (° C.) | 200 | 200 | 200 | 200 | 200 | — |
| Content ratio | | 0.1 | 0.000125 | 0.625 | 0.1 | 0.125 | — |
| Evaluation | Weather resistance of light absorbing agent | B | A | A | B | C | D |

As shown in Table 2, there was a result in which the optical sheet in each example was more excellent in weather resistance than the comparative example. In the above description, the evaluation was performed using an acrylic resin ("SUMIPEX MG5" manufactured by Sumitomo Chemical Co., Ltd.) instead of the polycarbonate. However, it was recognized that in order to more remarkably perform the weather resistance evaluation of the light absorbing agent, the same tendency was obtained even using polycarbonate.

INDUSTRIAL APPLICABILITY

The optical sheet of the present invention has a specific wavelength absorption layer that contains a polycarbonate as a main material and a light absorbing agent that absorbs light of a specific wavelength, out of light in a wavelength range of 350 nm or more and 740 nm or less. The polycarbonate has a viscosity average molecular weight Mv of 20,000 to 30,000. With this, the optical sheet can absorb light in a specific wavelength range among visible light. In addition, since the viscosity average molecular weight Mv of the polycarbonate is 20,000 to 30,000, for example, at a time of extrusion molding, extrusion molding can be performed in a state where the polycarbonate and the light absorbing agent are sufficiently mixed with each other. Therefore, it is possible to prevent a state where the light absorbing agent is excessively aggregated after molding. In addition, since the viscosity average molecular weight Mv of the polycarbonate is 20,000 to 30,000, the optical sheet has sufficient strength. As described above, the optical sheet of the present invention prevents aggregation of the light absorbing agent and sufficient strength.

REFERENCE SIGNS LIST

1 Optical sheet
1' Sheet
1A Optical sheet
2 Frame
3 Lens with optical sheet
4 Lens
5 Mounting portion
6 Collar
7 Light transmitting member
10 Optical component
10' Optical component
11 Specific wavelength absorption layer
12 Polarized film
13 Adhesive layer
21 Rim portion
22 Bridge portion
23 Temple portion
24 Nose pad portion
100 Optical sheet manufacturing apparatus
200 Sheet supply unit
210 Extruder
211 Molten resin discharge unit
212 Pipe
220 T-die
300 Sheet molding unit
310 Touch roll
320 Cooling roll
330 Post-stage cooling roll
400 Optical component manufacturing apparatus
500 Resin supply unit
600 Mold
610 Cavity
620 Supply port
630 Upper member
640 Lower member
641 Bottom surface

The invention claimed is:

1. An optical sheet, comprising:
a specific wavelength absorption layer comprising a bisphenol type polycarbonate and a light absorbing agent such that the bisphenol type polycarbonate has a skeleton derived from bisphenol and has a content in a range of 87 wt % to 99.949 wt % in the specific wavelength absorption layer and that the light absorbing agent absorbs light of a specific wavelength out of light in a wavelength range of 350 nm to 740 nm and has a content in a range of 0.03 wt % to 5 wt % in the specific wavelength absorption layer,
wherein the optical sheet is configured to be laminated on a substrate of an optical component, the light absorbing agent includes a light absorbing agent having a melting point in a range of 300° C. to 400° C., and the bisphenol type polycarbonate has a viscosity average molecular weight Mv of 24,000 to 27,500, and a melt flow rate in a range of 5.3 g/10 min to 25 g/10 min measured in accordance with JIS K7210 such that the bisphenol type polycarbonate and the light absorbing agent are mixed to prevent the light absorbing agent from aggregating in the specific wavelength absorption layer.

2. The optical sheet according to claim 1, wherein the bisphenol type polycarbonate has a water absorption rate of in a range 0.02% to 0.2%.

3. The optical sheet according to claim 2, wherein the specific wavelength absorption layer is formed such that the bisphenol type polycarbonate and the light absorbing agent satisfy T1<T2, where T1 is a melting point of the bisphenol type polycarbonate, and T2 is a melting point of the light absorbing agent.

4. The optical sheet according to claim 2, wherein the specific wavelength absorption layer has a stretching degree of 10% or less.

5. The optical sheet according to claim 2, wherein the specific wavelength absorption layer further includes an ultraviolet absorbing agent that absorbs light in a wavelength range of 100 nm to 420 nm.

6. The optical sheet according to claim 5, wherein the specific wavelength absorption layer is formed such that a content of the ultraviolet absorbing agent in the specific wavelength absorption layer is in a range of 0.05 wt % to 8 wt %.

7. The optical sheet according to claim 5, wherein the specific wavelength absorption layer is formed such that the light absorbing agent and the ultraviolet absorbing agent satisfy a ratio A/B in a range of 0.00375 to 0.625, where A is a content of the light absorbing agent in the specific wavelength absorption layer, and B is a content of the ultraviolet absorbing agent in the specific wavelength absorption layer.

8. The optical sheet according to claim 2, wherein the light absorbing agent includes at least one selected from the group consisting of a phthalocyanine-based pigment, a porphyrin-based compound, and a merocyanine dye.

9. The optical sheet according to claim 1, wherein the specific wavelength absorption layer is formed such that the bisphenol type polycarbonate and the light absorbing agent satisfy T1<T2, where T1 is a melting point of the bisphenol type polycarbonate, and T2 is a melting point of the light absorbing agent.

10. The optical sheet according to claim 9, wherein the specific wavelength absorption layer has a stretching degree of 10% or less.

11. The optical sheet according to claim 1, wherein the specific wavelength absorption layer is formed such that a content of the light absorbing agent in the specific wavelength absorption layer is in a range of 0.03 wt % to 4 wt %.

12. The optical sheet according to claim 1, wherein the specific wavelength absorption layer has a stretching degree of 10% or less.

13. The optical sheet according to claim 1, wherein the specific wavelength absorption layer further includes an ultraviolet absorbing agent that absorbs light in a wavelength range of 100 nm to 420 nm.

14. The optical sheet according to claim 13, wherein the specific wavelength absorption layer is formed such that a content of the ultraviolet absorbing agent in the specific wavelength absorption layer is in a range of 0.05 wt % to 8 wt %.

15. The optical sheet according to claim 14, wherein the specific wavelength absorption layer is formed such that the light absorbing agent and the ultraviolet absorbing agent satisfy a ratio A/B in a range of 0.00375 to 0.625, where A is a content of the light absorbing agent in the specific wavelength absorption layer, and B is a content of the ultraviolet absorbing agent in the specific wavelength absorption layer.

16. The optical sheet according to claim 13, wherein the specific wavelength absorption layer is formed such that the light absorbing agent and the ultraviolet absorbing agent satisfy a ratio A/B in a range of 0.00375 to 0.625, where A is a content of the light absorbing agent in the specific wavelength absorption layer, and B is a content of the ultraviolet absorbing agent in the specific wavelength absorption layer.

17. The optical sheet according to claim 1, wherein the light absorbing agent includes at least one selected from the group consisting of a phthalocyanine-based pigment, a porphyrin-based compound, and a merocyanine dye.

18. The optical sheet according to claim 17, wherein the phthalocyanine-based pigment excludes a phthalocyanine blue.

19. The optical sheet according to claim 1, wherein the light absorbing agent includes the light absorbing agent having the melting point in a range of 300° C. to 370° C., and the bisphenol type polycarbonate has the viscosity average molecular weight Mv of 24,000 to 27,000, and the melt flow rate in a range of 5.3 g/10 min to 9 g/10 min measured in accordance with JIS K7210.

20. An optical component, comprising:
a substrate; and
the optical sheet of claim 1 such that the optical sheet is laminated on the substrate.

* * * * *